US006366601B1

(12) United States Patent
Ghosh et al.

(10) Patent No.: US 6,366,601 B1
(45) Date of Patent: Apr. 2, 2002

(54) VARIABLE RATE SPREAD SPECTRUM COMMUNICATION METHOD AND APPARATUS

(75) Inventors: Amitava Ghosh, Vernon Hills; Brian K. Classon, Streamwood; Mark C. Cudak, McHenry; Louay Jalloul, Palatine, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/442,367

(22) Filed: Nov. 17, 1999

(51) Int. Cl.[7] .............................................. H04L 27/30

(52) U.S. Cl. ...................... 375/130; 375/261; 375/269; 375/302; 370/347

(58) Field of Search ................................. 375/130, 146, 375/147, 148, 261, 302, 331, 296; 370/337, 347, 529; 455/21, 234.2

(56) References Cited

U.S. PATENT DOCUMENTS

| 5,781,542 A | | 7/1998 | Tanaka et al. ............... 370/342 |
| 5,909,469 A | | 6/1999 | Frodigh et al. ............. 375/302 |
| 6,125,148 A | * | 9/2000 | Frodigh et al. ............. 375/261 |
| 6,275,488 B1 | * | 8/2001 | Gudak et al. ............... 370/347 |
| 6,330,288 B1 | * | 12/2001 | Budka et al. ............... 375/296 |

OTHER PUBLICATIONS

Shu Lin and Daniel J. Costello, Error Control Coding: Fundamentals and Applications, Prentice Hall, 1983, p. 477–494.

David Chase, "Code Combining—A Maximum–Likelihood Decoding Approach for Combining an Arbitrary Number of Noisy Packets," *IEEE Trans. Commun. Technol.*, vol. COM–33, No. 5, May 1985.

Anwarul Hasan, Vijay K. Bhargava, Tho Le–Ngoc, "Algorithms and Architectures for the Design of a VLSI Reed–Solomon Codec," Reed–Solomon Codes and Their Applications, IEEE Press, 1994.

Joachim Hagenauer, "Rate–Compatible Punctured Convolutional Codes (RCPC Codes) and their Applications," *IEEE Transactions on Communications*, vol. 36, No. 4, Apr. 1998.

Samir Kallel, "Generalized Type II Hybrid ARQ Scheme Using Punctured Convolutional Coding," *IEEE Transactions on Communications*, vol. 38, No. 11, Nov. 1990.

Douglas N. Rowitch and Laurence B. Milstein, "Rate Compatible Punctured Turbo (RCPT) Codes in a Hybrid FEC/ARQ System," ICC 1997.

Samir Kallel, "Complementary Punctured Convolution (CPC) Codes and Their Applications," *IEEE Transactions on Communications*, vol. 43, No. 6, Jun. 1995.

(List continued on next page.)

Primary Examiner—Stephen Chin
Assistant Examiner—Shuwang Liu

(57) ABSTRACT

A communication system (100) provides selecting a first modulation-coding scheme (111) based on a quality indicator of a communication between a source user and a first destination user, determining a first possible number of data bits (201) that can be modulated and encoded according to selected modulation-coding scheme (111) and spread according to one spreading code of a plurality of spreading codes (108-1 through 108-k) which results in fitting in a predetermined time frame, determining a first number of data bits (102) to be transmitted from the source user to the first destination user, determining a first load level based on comparing first number of data bits (102) and first possible number of data bits (201), and, if the first load level is unequal to a whole number, rounding to a next first whole number, selecting a first number of plurality of spreading codes (108-1 through 108-k) based on the first whole number of load level for spread coding of first number of data bits (102) after being modulated and coded according to selected modulation-coding scheme (111).

52 Claims, 2 Drawing Sheets

OTHER PUBLICATIONS

Siemans AG, "Comparison of Hybrid ARQ Types I and II–II for TDD", Contribution to No. TSGR1#3(99)177to the 3$^{rd}$ Generation Partnership Program (3GPP), Nynashamn, Sweden, Mar. 1999.

Xiaoxin, Justin Chuang, Kapil Chawla and Jim Whitehead, "Performance Comparison of Link Adaptation and Incremental Redundancy in Wireless Data Networks," Wireless Communications and Networking Conference, New Orleans, Sep. 21–24, 1999.

Dimitri Bertsekas, Robert Gallager, *Data Networks Second Edition*, Prentice–Hall, 1992, p. 64–85.

Samir Kallel, "Efficient Hybrid ARQ Protocols with Adaptive Forward Error Correction," *IEEE Transactions on Communications*, vol. 42, No. 2/3/4, Feb./Mar./Apr. 1994.

Siemans AG, "ARQ error control techniques", Contribution to No. TSGR1#3(99)178to the 3$^{rd}$ Generation Partnership Program (3GPP), Nynashamn, Sweden, Mar. 1999.

C. Berrou et.al., "Near Shannon limit error–correcting coding and decoding:turbo codes," Proc. ICC'93, pp. 1064–1070. D. Chase, IEEE Trans. Commun., 1985.

.–C. Chan and E. Geraniotis, "An adaptive hybrid FEC/ARQ protocol using turbo codes," 1997 IEEE International Conference on Universal Personal Communications Record, 1997, pp. 541–545.

K. Narayanan, "A novel ARQ technique using the turbo coding principle," IEEE Commun. Ltrs, p. 49–51, Mar. 1997.

* cited by examiner

| MCS | 15 CODES | | 1 CODE | | CODE RATE | MODULATION |
|---|---|---|---|---|---|---|
| | INFO RATE (MBPS) | PACKET SIZE | INFO RATE (MBPS) | PACKET SIZE | | |
| 7 | 6.9120 | 34560 | 0.4608 | 2304 | 1 | 64 |
| 6 | 5.1840 | 25920 | 0.3456 | 1728 | 3/4 | 64 |
| 5 | 3.4560 | 17280 | 0.2304 | 1152 | 1/2 | 64 |
| 4 | 3.4560 | 17280 | 0.2304 | 1152 | 3/4 | 16 |
| 3 | 2.3040 | 11520 | 0.1536 | 768 | 1/2 | 16 |
| 2 | 1.7280 | 8640 | 0.1152 | 576 | 3/4 | 4 |
| 1 | 1.1520 | 5760 | 0.0768 | 384 | 1/2 | 4 |

*FIG.2*

VARIABLE RATE SPREAD SPECTRUM COMMUNICATION METHOD AND APPARATUS

REFERENCES TO RELATED APPLICATION(S)

This application is related to applications filed on the same day having the same inventorship and assigned to a common assignee. The related applications having Ser. Nos. 09/442,250 and 09/603,426; each of the referenced applications is incorporated by reference herein.

RELATED FIELD OF THE INVENTION

The invention relates to the field of communication systems and more particularly, a code division multiple access communication system.

BACKGROUND OF THE INVENTION

A code division multiple access (CDMA) communication system operating according to any of the Interim Standard (IS) 95 specification includes a communication structure for providing voice, data, and simultaneous voice and data communications. A generalized multi-media service may also be supported in such communication system. For multimedia application including an internet access, the data throughput is directly related to the quality of the service. The data throughput, however, may be limited due to the carrier signal bandwidth and effectiveness of the available bandwidth utilization. For example, a CDMA carrier signal with 1.25 MHz bandwidth may not support peak data rate of more than 0.5 Mbps under certain conditions. For a multimedia or an internet access application, communication data rates of more than 0.5 Mbps are highly desirable due to the nature of such types of communications while complying with the communication standards such as IS-95A, B and C.

Therefore, there is a need for a method and apparatus for providing high data rate communications in a CDMA communication system.

BRIEF DESCRIPTION OF THE DRAWINGS

FIG. 2 depicts a table containing variable data rate selection based on selected modulation coding scheme and spreading code.

DETAILED DESCRIPTION OF THE PREFERRED EMBODIMENT(S)

Figure 1:
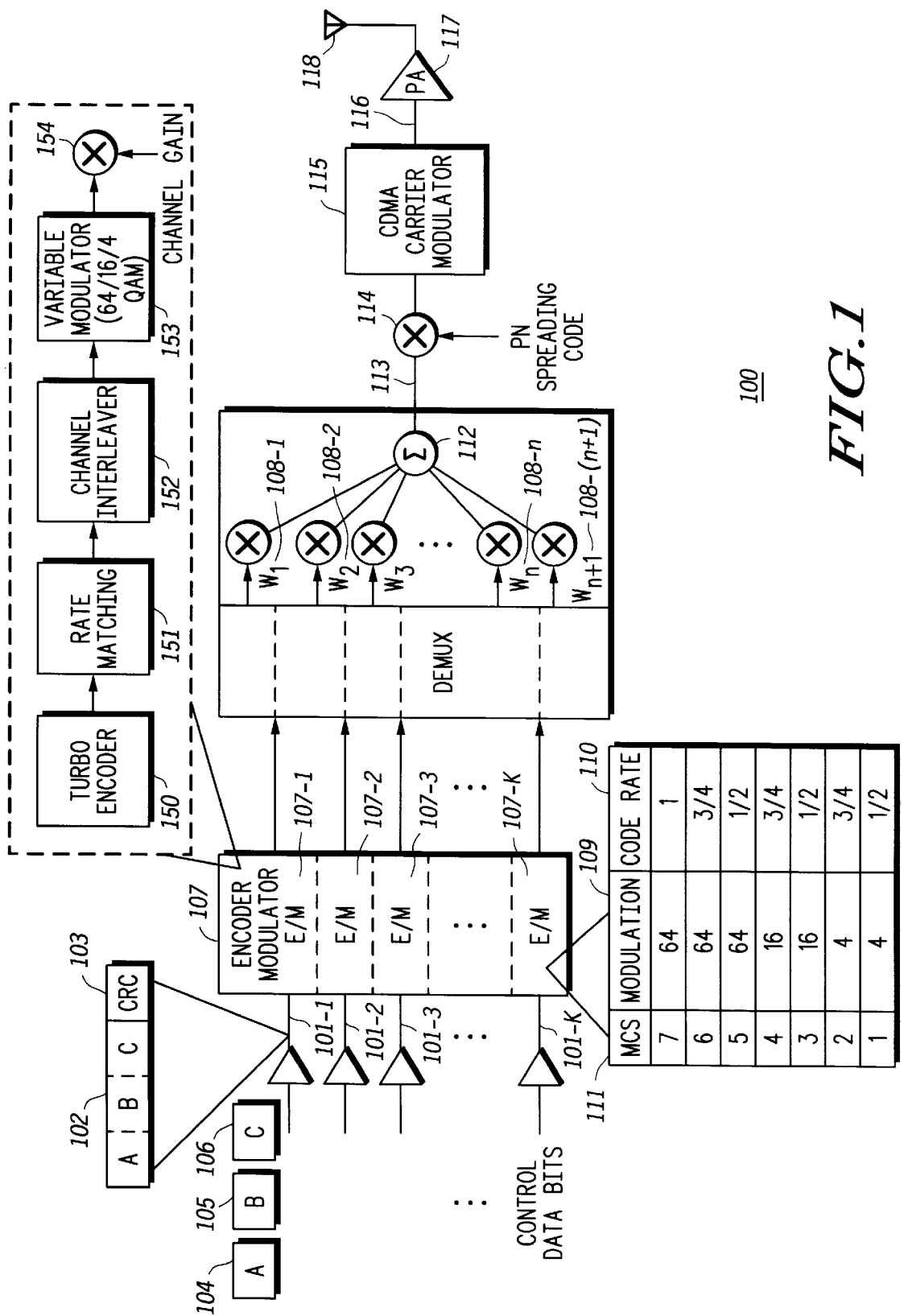
FIG. 1 depicts block diagram of a communication system operation according to various aspects of the invention.

According to various aspects of the invention, the bandwidth capacity of a communication link from a source user to a destination user is maximized. A modulation-coding scheme is selected based on a communication quality criteria such as carrier to interference ratio of a communication between the source user and the destination user. The carrier to interference ratio may be based on an earlier communication between the source user and the destination user.

The source user may be a communication system base station and the destination user may be a mobile station. As such, the communication is a downlink communication. A possible number of data bits is determined that can be modulated and encoded according to the selected modulation-coding scheme and spread according to one spreading code of a plurality of spreading codes which results in fitting in a predetermined time frame. The plurality of spreading codes may be orthogonal Walsh codes as commonly known. As such, the communication system may be a code division multiple access communication system. The modulation-coding scheme includes modulation according to a quadrature amplitude modulation level and coding according to a coding rate. The coding rate may be selected from a plurality of turbo encoding rates available in the communication system. The quadrature amplitude modulation level may also be selected from a plurality of quadrature amplitude modulation levels available in the communication system. As such, the modulation-coding scheme may be selected from a plurality of modulation-coding schemes available in the communication system.

A number of data bits to be transmitted from the source to the destination is determined. Load Level of the predetermined time frame is determined based on a ratio of the number of data bits and the possible number of data bits. The load level is rounded to a next whole number. A number of the plurality of spreading codes is selected which equals to the whole number for spread coding of the number of data bits after being modulated and coded according to the selected modulation-coding scheme. As such, the communication bandwidth is maximized by modulating and encoding the number of data bits according to the selected modulation-coding scheme and spreading according to the selected number of the plurality of spreading codes for transmission from the source to the destination.

The number of data bits may be a part or an entire data packet to be transmitted. In case of two or more data packets, at least two packets of data to be transmitted from the source to the destination are appended to form an appended packet of data, and using the appended packets of data for determining the number of data bits. Error detection bits such as cyclic redundancy check bits may be appended to the appended packets of data before determining the number of data bits. As such, whether there is one or more packets of data, all packets are appended and given a single set of error detection bits.

According to various aspects of the invention, when the whole number is larger than number of the plurality of spreading codes, at least one of the least two packets of data is scheduled for a subsequent transmission. At least one of the non-selected of the least two packets of data is used for determining the number of data bits.

According to various aspects of the invention, where the whole number is larger than the number of the plurality of spreading codes, the selected modulation-coding scheme may be changed or adjusted to a new modulation-coding scheme. A new possible number of data bits is then determined based on the new modulation-coding scheme. Load Level based on a new ratio of the number of data bits and the new possible number of data bits is determined, and rounded to a new next whole number. A new number of the plurality of spreading codes is selected which equals to the new whole number for spread coding of the number of data bits after being modulated and coded according to the new selected modulation-coding scheme.

Various aspects of the invention may be more apparent by making references to a transmitter 100 shown in FIG. 1. A source user at 101-1 inputs a number of data bits 102 for transmission. The number of data bits may have a cyclic redundancy bit 103. Moreover, number of data bits 102 may be formed by appending several packets of data such as packets of data 104-06 each having different number of data bits. Other source users at 101-2 through 102-k may also input data bits at respective inputs. A modulation-coding scheme is selected at encoder/modulator 107 based on a carrier quality criteria such as carrier to interference ratio of a communication between the source user and the destination user. The carrier to interference ratio may be based on an earlier communication between the source user and the destination user. A possible number of data bits is determined that can be modulated and encoded according to a selected modulation-coding scheme at encoder/modulator 107 and spread according to one spreading code of a plurality of spreading codes 108 which results in fitting in a predetermined time frame. Such time frame may be 5 msec long according to the known IS-95 CDMA standards.

For example if the next whole number is equal to five, five of the plurality of spreading codes 108 are selected. As such, the usage of the communication bandwidth is maximized by modulating and encoding the number of data bits according to the selected modulation-coding scheme and spreading according to the selected number of the plurality of spreading codes for transmission from the source to the destination. After spreading according to the selected number of the plurality of spreading codes 108, a summer 112 sums the result. A summed result 113 is complex scrambled at spreader 114 by a pseudo random (PN) scrambling code. The resulting signal is carrier-modulated and filtered in carrier modulator 115 to produce a CDMA carrier signal 116. The CDMA carrier signal 116 is amplified in a linear power amplifier 117 and transmitted from an antenna 118. The plurality of spreading codes 108 may be Walsh codes as commonly known. As such, the communication system may be a code division multiple access communication system operating according to the known IS-95 CDMA standards.

The modulation-coding scheme selected at encoder/modulator 107 includes modulation according to a quadrature amplitude modulation level and coding according to a coding rate. The coding rate may be selected from a plurality of turbo encoding rates 110 available in the communication system. The quadrature amplitude modulation level may also be selected from a plurality of quadrature amplitude modulation levels 109 available in the communication system. As such, the modulation-coding scheme may be selected from a plurality of modulation-coding schemes 111 available in the communication system. Any of the encoder/modulators 107-1 through k may include a turbo encoder 150, a rate matching 151, a channel interleaver 152, a variable amplitude quadrature modulator 153 and a channel gain adjuster 154 to encode and modulate input data bits before spread coding according to any of the codes 108-1 through "n+1".

According to various aspects of the invention, where the whole number is larger than the number of the plurality of spreading codes, the selected modulation-coding scheme may be changed or adjusted to a new modulation-coding scheme or data packets of data bits 102 may be scheduled for an immediate and subsequent transmission. In case of changing the modulation-coding scheme, a new possible number of data bits is then determined based on the new modulation-coding scheme. Load Level based on a new ratio of the number of data bits and the new possible number of data bits is determined, and rounded to a new next whole number. A new number of the plurality of spreading codes is selected which equals to the new whole number for spread coding of the number of data bits after being modulated and coded according to the new selected modulation-coding scheme.

According to various aspects of the invention, in a communication system, a first modulation-coding scheme is selected based on a quality indicator of a communication between a source user and a first destination user. A first possible number of data bits is determined that can be modulated and encoded according to the selected modulation-coding scheme and spread according to one spreading code of a plurality of spreading codes which results in fitting in a predetermined time frame. Such time frame may be 5 msec. long.

Referring to FIG. 2, a table 200 shows different possible number of data bits in column 201 using different modulation-coding schemes, shown in column 202 that can fit in a 5 msec. time frame using only one spreading code. A first number of data bits to be transmitted from the source user to the first destination user is determined. A first load level based on comparing the first number of data bits and the first possible number of data bits is determined. The load level may simply be determined by determining a ratio of the data bits 201 and the first data bits to be transmitted. If the first load level is unequal to a whole number, the first load level is rounded to a next first whole number. A first number of the plurality of spreading codes is selected based on the first whole number of load level for spread coding of the first number of data bits after being modulated and coded according to the selected modulation-coding scheme. For example if the whole number of load level is equal to 15, fifteen of the plurality of spreading codes is selected. In an example, if the modulation-coding scheme is selected to be at MCS6, the effective data rate of the communication between the source user and the destination user would be equal to 5.1840 Mbps in a 5 msec. time frame. This is an efficient use of the communication resources allowing high data rate communication for application such as internet access. Modulating and encoding the first number of data bits according to the selected first modulation-coding scheme and spreading according to the selected first number of the plurality of spreading codes takes place for a transmission from the source to the first destination user.

When the first load level is unequal to a whole number, the first number of data bits may go through a step of rate matching to a nearest possible data rate to produce a rate adjusted first number of data bits. The rate adjusted first number of data bits is substituted for the first number of data bits in determining the first load level. The rate matching may be according to at least one of decreasing the selected modulation-coding scheme, using data bits repetition, and puncturing a plurality of data bits in an encoded version of the first number of data bits. Such puncturing may take place after encoding operation shown in turbo encoder 150. Modulating and encoding the rate adjusted first number of data bits according to the selected first modulation-coding scheme and spreading according to the selected first number of the plurality of spreading codes takes place for a transmission from the source to the first destination user.

In case there are more than one destination user, the process is repeated for the source user and a second destination user based on a selected second modulation-coding scheme, a second possible number of data bits corresponding to the second selected modulation-coding scheme, and a second number of data bits to be transmitted from the source user to the second destination user. A second number of the plurality of spreading codes is selected such that a combined number of the first and second number of the plurality of spreading codes remains less than or equal to the plurality of spreading codes. For example, if there is at most fifteen spreading codes 108, the combined number would remain either less or equal to fifteen. While referring to FIG. 1, a demultiplexing block 180 demultiplexes the first and second number of data bits to correspondingly selected spreading codes after the being modulated and coded according to the selected modulation coding schemes. The first and second modulation-coding schemes may the same modulation-coding schemes. Modulating and encoding the first and second number of data bits respectively according to the first and second selected modulation-coding schemes and spreading according to the first and second selected numbers of the plurality of spreading codes take place for a transmission from the source to the first and second destination users over a single time frame of the predetermined time frame. Summing a result of the first and second numbers of data bits after respective modulation-coding and spreading for the transmission also takes place.

In case when at least one the first and second number of data bits is associated with voice communication, at least one of the first or second selected modulation-coding schemes is limited to a predetermined modulation coding scheme to allow voice communication to pass through with minimal problem. For example, the limited modulation scheme may be any of the modulation schemes 111 that has a quadrature modulation level of four (i.e. quadrature phase shift keying: QPSK). Moreover, alternatively or in conjunction, in case when at least one the first and second number of data bits is associated with voice communication, at least one of the first or second spreading code is limited to a predetermined number of spreading codes to allow voice communication to pass through with minimal problem. As such, the effective data rate of the data information may be limited which as a result allows the voice communication to pass through with minimal problem. Similarly, when the source user is transmitting voice information to the first destination user in combination with data information, the selection of the first modulation-coding scheme is limited to a predetermined modulation-coding scheme.

In case some control channel data bits are being transmitted along, such as for example, control data bits at 101-k, modulating and encoding the first and a number of control data bits respectively according to the first and a second selected modulation-coding schemes at modulator-encoder 107-K and spreading according to the first and a second selected numbers of the plurality of spreading codes, such as Wn+1 (108-"n+1" shown in FIG. 1) takes place for a transmission from the source to the first destination user. Control data may also be transmitted to other destination users. Summing a result of the first number of data bits and second number of control data bits after respective modulation-coding and spreading takes place at summer 112 for the transmission.

The selected first number of the plurality of spreading codes may be larger than the plurality of spreading codes. For example, fifteen spreading codes may be available, but after determining the load level and taking the ratio, the whole number of the load level may be larger than fifteen. A portion of the first number of data bits is selected for a subsequent transmission, and a remaining non-selected portion is used for determining the first number of data bits. Alternatively, the selected modulation-coding scheme may be changed to a new modulation-coding scheme, and repeating the process while substituting the new modulation-coding scheme for the previously selected modulation-coding scheme to determine a new possible number of data bits. A new first load level is determined based on comparing the first number of data bits and the new first possible number of data bits, and, if the new first load level is unequal to a whole number, rounding to a next first whole number of the new first load level. A new first number of the plurality of spreading codes is selected based on the new load level number for spread coding of the first number of data bits after being modulated and coded according to the new selected modulation-coding scheme.

There may be more than one packet of data to be transmitted to the first destination user. In that case, at least two packets of data are appended to be transmitted from the source to the first destination user to form an appended packet of data, and using the appended packets of data for determining the first number of data bits. In this situation, if the selected first number of plurality of spreading codes is larger than the plurality of spreading codes, at least one of the least two packets of data is selected for a subsequent transmission, and using at least one of non-selected of the least two packets of data for determining the first number of data bits. Appending overhead data bits including at least cyclic redundancy data bits and tail data bits to the appended packet of data may take place before determining the first number of data bits. Similarly, appending overhead data bits including at least cyclic redundancy data bits and tail data bits to the first number of data bits may take place before determining the first number of data bits.

The quality indicator may be based on a carrier to interference ratio of a communication between the source user and the destination user. Moreover, the quality indicator may alternatively or in conjunction may be based on carrier to noise ratio, error rate, eye-opening and total metric in a turbo decoder. The communication system may also be a code division multiple access communication system.

The first modulation-coding scheme may include modulation according to a quadrature amplitude modulation level and coding according to a coding rate. The selection of the coding rate may be from a plurality of turbo encoding rates 110 available in the communication system. The selection of the quadrature amplitude modulation level may be from a plurality of quadrature amplitude modulation levels 109 available in the communication system. As a result, the selection of the first modulation coding scheme may be from a plurality of modulation-coding schemes 111 available in said communication system.

What is claimed is:

1. A method in a communication system comprising the steps of:
   a) selecting a first modulation-coding scheme based on a quality indicator of a communication between a source user and a first destination user;
   b) determining a first possible number of data bits that can be modulated and encoded according to said selected modulation-coding scheme and spread according to one spreading code of a plurality of spreading codes which results in fitting in a predetermined time frame;
   c) determining a first number of data bits to be transmitted from said source user to said first destination user;
   d) determining a first load level based on comparing said first number of data bits and said first possible number of data bits, and, if said first load level is unequal to a whole number, rounding to a next first whole number of said first load level;
   e) selecting a first number of said plurality of spreading codes based on said first whole number of load level for spread coding of said first number of data bits after being modulated and coded according to said selected modulation-coding scheme.

2. The method as recited in claim 1, wherein said first load level is unequal to a whole number, further comprising the step of rate matching said first number of data bits to a nearest possible data rate to produce a rate adjusted first number of data bits.

3. The method as recited in claim 2 wherein said rate adjusted first number of data bits is substituted for said first number of data bits in determining said first load level.

4. The method as recited in claim 2 wherein said rate matching is according to at least one of decreasing said selected modulation-coding scheme, using data bits repetition, and puncturing a plurality of data bits in said first number of data bits.

5. The method as recited in claim 1 further comprising the steps of:
repeating said steps (a) through (e) for said source user and a second destination user based on a selected second modulation-coding scheme, a second possible number of data bits corresponding to said second selected modulation-coding scheme, and a second number of data bits to be transmitted from said source user to said second destination user;
determining a second number of said plurality of spreading coding schemes such that a combined number of said first and second number of said plurality of spreading coding schemes remains less than or equal to said plurality of spreading orthogonal coding schemes.

6. The method as recited in claim 5 wherein at least one the said first and second number of data bits is associated with voice communication, further comprising the step of limiting at least one of said first or second selected modulation coding schemes to a predetermined modulation coding scheme.

7. The method as recited in claim 1, wherein said source user is transmitting voice information to said first destination user in combination with data information, further comprising the steps of:
limiting said selecting a first modulation-coding scheme to a predetermined modulation-coding scheme.

8. The method as recited in claim 5 wherein said first and second modulation-coding schemes are the same modulation-coding schemes.

9. The method as recited in claim 5 further comprising the step of modulating and encoding said first and second number of data bits respectively according to said first and second selected modulation-coding schemes and spreading according to said first and second selected numbers of said plurality of spreading codes for a transmission from said source to said first and second destination users over a single time frame of said predetermined time frame.

10. The method as recited in 9 further comprising the step of summing a result of said first and second numbers of data bits after respective modulation-coding and spreading for said transmission.

11. The method as recited in claim 1 further comprising the step of:
modulating and encoding said first number of data bits according to said selected first modulation-coding scheme and spreading according to said selected first number of said plurality of spreading codes for a transmission from said source to said first destination user.

12. The method as recited in claim 2 further comprising the step of:
modulating and encoding said rate adjusted first number of data bits according to said selected first modulation-coding scheme and spreading according to said selected first number of said plurality of spreading codes for a transmission from said source to said first destination user.

13. The method as recited in claim 1 further comprising the step of modulating and encoding said first and a number of control data bits respectively according to said first and a second selected modulation-coding schemes and spreading according to said first and a second selected numbers of said plurality of spreading codes for a transmission from said source to said first destination user.

14. The method as recited in 13 further comprising the step of summing a result of said first number of data bits and second number of control data bits after respective modulation-coding and spreading for said transmission.

15. The method as recited in claim 1, wherein said selected first number of said plurality of spreading codes is larger than said plurality of spreading codes, further comprising the steps of:
selecting a portion of said first number of data bits for a subsequent transmission;
using a remaining non-selected portion of said first number of data bits for said determining said first number of data bits at said step (c).

16. The method as recited in claim 1, wherein said selected first number of said plurality of spreading codes is larger than said plurality of spreading codes, further comprising the steps of:
changing said selected modulation-coding scheme to a new modulation-coding scheme;
repeating said step (b) while substituting said new modulation coding scheme for said modulation-coding scheme to determine a new possible number of data bits;
determining a new first load level based on comparing said first number of data bits and said new first possible number of data bits, and, if said new first load level is unequal to a whole number, rounding to a next first whole number of said new first load level;
selecting a new first number of said plurality of spreading codes based on said new first whole number of load level for spread coding of said first number of data bits after being modulated and coded according to said new selected modulation-coding scheme.

17. The method as recited in claim 1 further comprising the step of:
appending at least two packets of data to be transmitted from said source to said first destination user to form an appended packet of data, and using said appended packets of data for said determining said first number of data bits at said step (c).

18. The method as recited in claim 17, wherein said selected first number of said plurality of spreading codes is larger than said plurality of spreading codes, further comprising the steps of:
selecting at least one of said least two packets of data for a subsequent transmission;
using at least one of non-selected of said least two packets of data for said determining said first number of data bits at said step (c).

19. The method as recited in claim 17 further comprising the step of:
appending overhead data bits including at least cyclic redundancy data bits and tail data bits to said appended packet of data before said determining said first number of data bits at step (c).

20. The method as recited in claim 1 further comprising the step of:
appending overhead data bits including at least cyclic redundancy data bits and tail data bits to said first number of data bits before said determining said first number of data bits at step (c).

21. The method as recited in claim 1 wherein said quality indicator is based on a carrier to interference ratio of a communication between said source user and said first destination user.

22. The method as recited in claim 1 wherein said communication system is a code division multiple access communication system.

23. The method as recited in claim 1 wherein said first modulation-coding scheme includes modulation according to a quadrature amplitude modulation level and coding according to a coding rate.

24. The method as recited in claim 23 further comprising the step of:

selecting said coding rate from a plurality of turbo encoding rates available in said communication system.

25. The method as recited in claim 20 further comprising the steps of:

selecting said quadrature amplitude modulation level from a plurality of quadrature amplitude modulation levels available in said communication system.

26. The method as recited in claim 1 wherein said selecting said first modulation coding scheme is from a plurality of modulation-coding schemes available in said communication system.

27. The method as recited in claim 26 wherein each modulation-coding scheme of said plurality of modulation-coding schemes includes a pair of modulation level and coding rate wherein each pair including modulation according to a quadrature amplitude modulation level and coding according to a coding rate.

28. The method as recited in claim 27, wherein said communication system includes a plurality of available quadrature amplitude modulation levels and a plurality of coding rates, further comprising the step of pairing at least one modulation level to at least one coding rate to create a plurality of pairs of modulation level and coding rate, wherein each of said plurality of modulation-coding schemes is based on one pair of said pairs of modulation level and coding rate.

29. The method as recited in claim 1 wherein said plurality of spreading codes is selected from a plurality of orthogonal spreading codes, plurality of quasi orthogonal spreading codes and a plurality of random spreading codes.

30. An apparatus in a communication system comprising:
   a) means for selecting a first modulation-coding scheme based on a quality indicator of a communication between a source user and a first destination user;
   b) means for determining a first possible number of data bits that can be modulated and encoded according to said selected modulation-coding scheme and spread according to one spreading code of a plurality of spreading codes which results in fitting in a predetermined time frame;
   c) means for determining a first number of data bits to be transmitted from said source user to said first destination user;
   d) means for determining a first load level based on comparing said first number of data bits and said first possible number of data bits, and, if said first load level is unequal to a whole number, rounding to a next first whole number of said first load level;
   e) means for selecting a first number of said plurality of spreading codes based on said first whole number of load level for spread coding of said first number of data bits after being modulated and coded according to said selected modulation-coding scheme.

31. The apparatus as recited in claim 30, wherein said first load level is unequal to a whole number, further comprising means for rate matching said first number of data bits to a nearest possible data rate to produce a rate adjusted first number of data bits.

32. The apparatus as recited in claim 31 wherein said means for rate matching including to at least one of means for decreasing said selected modulation-coding scheme, means for using data bits repetition, and means for puncturing a plurality of data bits in said first number of data bits.

33. The apparatus as recited in claim 30 further comprising:

means for determining a second number of said plurality of spreading codes such that a combined number of said first and a second number of said plurality of spreading codes remains less than or equal to said plurality of spreading orthogonal coding schemes.

34. The apparatus as recited in claim 33 wherein at least one the said first and second number of data bits is associated with voice communication, further comprising means for limiting at least one of said first or second selected modulation coding schemes to a predetermined modulation coding scheme.

35. The apparatus as recited in claim 1, wherein said source user is transmitting voice information to said first destination user in combination with data information, further comprising:

means for limiting said selecting a first modulation-coding scheme to a predetermined modulation-coding scheme.

36. The apparatus as recited in claim 33 further comprising means for modulating and encoding said first and second number of data bits respectively according to said first and second selected modulation-coding schemes and spreading according to said first and second selected numbers of said plurality of spreading codes for a transmission from said source to said first and second destination users over a single time frame of said predetermined time frame.

37. The apparatus as recited in 36 further comprising means for summing a result of said first and second numbers of data bits after respective modulation-coding and spreading for said transmission.

38. The apparatus as recited in claim 30 further comprising:

means for modulating and encoding said first number of data bits according to said selected first modulation-coding scheme and spreading according to said selected first number of said plurality of spreading codes for a transmission from said source to said first destination user.

39. The apparatus as recited in claim 31 further comprising:

means for modulating and encoding said rate adjusted first number of data bits according to said selected first modulation-coding scheme and spreading according to said selected first number of said plurality of spreading codes for a transmission from said source to said first destination user.

40. The apparatus as recited in claim 30 further comprising means for modulating and encoding said first and a number of control data bits respectively according to said first and a second selected modulation-coding schemes and spreading according to said first and a second selected numbers of said plurality of spreading codes for a transmission from said source to said first destination user.

41. The apparatus as recited in 40 further comprising means for summing a result of said first number of data bits and second number of control data bits after respective modulation-coding and spreading for said transmission.

42. The apparatus as recited in claim 30, wherein said selected first number of said plurality of spreading codes is larger than said plurality of spreading codes, further comprising:
- means for selecting a portion of said first number of data bits for a subsequent transmission;
- means for using a remaining non-selected portion of said first number of data bits for said determining said first number of data bits.

43. The apparatus as recited in claim 30, wherein said selected first number of said plurality of spreading codes is larger than said plurality of spreading codes, further comprising:
- means for changing said selected modulation-coding scheme to a new modulation-coding scheme;
- means for substituting said new modulation-coding scheme for said modulation-coding scheme to determine a new possible number of data bits;
- means for determining a new first load level based on comparing said first number of data bits and said new first possible number of data bits, and, if said new first load level is unequal to a whole number, rounding to a next first whole number of said new first load level;
- means for selecting a new first number of said plurality of spreading codes based on said new first whole number of load level for spread coding of said first number of data bits after being modulated and coded according to said new selected modulation-coding scheme.

44. The apparatus as recited in claim 30 further comprising:
- means for appending at least two packets of data to be transmitted from said source to said first destination user to form an appended packet of data.

45. The apparatus as recited in claim 44, wherein said selected first number of said plurality of spreading codes is larger than said plurality of spreading codes, further comprising:
- means for selecting at least one of said least two packets of data for a subsequent transmission;
- means for using at least one of non-selected of said least two packets of data for said determining said first number of data bits.

46. The apparatus as recited in claim 44 further comprising:
- means for appending overhead data bits including at least cyclic redundancy data bits and tail data bits to said appended packet of data before said determining said first number of data bits.

47. The apparatus as recited in claim 30 further comprising:
- means for appending overhead data bits including at least cyclic redundancy data bits and tail data bits to said first number of data bits before said determining said first number of data bits.

48. The apparatus as recited in claim 30 further comprising:
- means for selecting a quadrature amplitude modulation level from a plurality of quadrature amplitude modulation levels available in said communication system.

49. The apparatus as recited in claim 30 wherein said means for selecting said first modulation-coding scheme further comprising:
- means for selecting a turbo code rate from a plurality of turbo code rates available in said communication system.

50. The apparatus as recited in claim 30 wherein said means for selecting said first modulation-coding scheme further comprising:
- means for selecting a turbo code rate from a plurality of turbo code rates available in said communication system.

51. The method as recited in claim 1, wherein said source user is transmitting voice information to said first destination user in combination with data information, further comprising the steps of:
- limiting said first plurality of spreading codes to a predetermined number of spreading codes.

52. The method as recited in claim 5 wherein at least one the said first and second number of data bits is associated with voice communication, further comprising the step of limiting at least one of said first or second number of spreading codes to a predetermined number of spreading codes.

* * * * *